Dec. 13, 1955   A. BERGSON   2,727,117
ELECTRIC REGULATOR

Filed Aug. 10, 1953   2 Sheets-Sheet 1

INVENTOR.
ARNOLD BERGSON
BY
ATTORNEY

Dec. 13, 1955    A. BERGSON    2,727,117
ELECTRIC REGULATOR

Filed Aug. 10, 1953    2 Sheets-Sheet 2

INVENTOR.
ARNOLD BERGSON
BY
ATTORNEY

United States Patent Office 2,727,117
Patented Dec. 13, 1955

2,727,117
ELECTRIC REGULATOR

Arnold Bergson, Cleveland, Ohio, assignor to Jack & Heintz, Inc., Cleveland, Ohio, a corporation of Delaware Application August 10, 1953, Serial No. 373,208

5 Claims. (Cl. 201—51)

This invention relates in general to spring assemblies and more particularly to improvements in non-linear function spring assemblies to include a pair of opposed spring members disposed between opposing forces to progressively increasingly resist spring compression resulting from the differentials occurring in the application of such opposing forces.

For various applications, such as sensitive relays, carbon pile regulators, and the like, it is desirable to provide for the magnetic attractive force an equal and opposing force free from hysteresis, so as to establish for a given degree of excitation a condition of differential equilibrium where small increases or reductions of excitation make available substantially large forces through a desired distance in a positive or negative sense from the datum value as may be required for operational purposes.

Non-linear function springs are currently used in many types of electromechanical applications. For use in a carbon pile voltage regulator, the spring acts as a mechanical bias or reference by matching the electromagnet force stroke curve over a certain portion of the force-stroke transfer characteristic. One of the principal limitations of the conventional finger type armature spring is in its inherent transfer characteristic where the square function magnet characteristic is matched with a linear function of the spring. Since a linear function can be tangent to a square function at only one point, the linear function is made to pass through the square curve at two points producing a limited region of operation with an inherent hysteresis loop. Furthermore, matching of the springs and magnet is quite critical since a mismatch will radically change operation.

In carbon pile armature springs of the conventional design the springs do not resist flexure with a force inversely proportional to the square of the flexing displacement. In fact, such springs produce a linear characteristic and are currently applied so as to intersect the square curve just above the slope of tangency. This combination produces a limited region of approximate match. The length of stroke of the matched region depends on the maximum force differential tolerable. To minimize the effects of vibration and shock, it is desirable to operate higher on the electromagnet force-stroke curve. In the region where incremental force increases rapidly with respect to incremental stroke, the matched stroke region decreases rapidly increasing drift and decreasing operational life.

The factors above are a few of the many considerations entering into the engineering design of a carbon pile voltage regulator with respect to the electromagnet-armature spring operational relationship. While this application is of major importance, my function spring is not limited to matching an inverse square function, but in the larger scope provides a simple means for matching many types of complex functions which could give wider application to other problems.

My function spring differs from the conventional carbon pile armature springs in that the leafs are internal and of a functional cross section. It employs a pair of identical function springs mounted on such that the leaf tips of one spring are in contact with the leaf tips of the other spring so as to form a V with internal vertex. An axial force applied to the combination causes the springs to deflect until the leaf tips become tangent. Since the leaf tip width is small, the initial tangency comes at relatively little applied force. Further increases in force reduce the free length of the leaf while increasing the effective width thereby increasing the stiffness of the leaf to further deflection.

The contour of my spring may be a straight line or a curve and the function spring may be designed to match curves other than square functions. Using a pair of function springs such that the leaf tips of one spring are in contact with the leaf tips of the other spring to form a V, gives reduced hysteresis and static friction effects in operation as compared with a single spring operating against a surface.

Since the carbon discs used in carbon pile voltage regulators are subject to a change in thickness with temperature variation and life, the improved matching provided by the function spring will provide less drift in regulation under the above conditions as well as increased accuracy and life. Furthermore, my function spring is less critical of manufacture since the physical condition of the tip extremity is less effective in the operating region and its degree of squareness is less important.

It is therefore an object of my invention to provide an improved non-linear function spring assembly to include a pair of opposed springs disposed between two applied opposing forces and so designed as to progressively increasingly resist spring compression resulting from differentials in the application of such opposing forces.

With the foregoing and other objects in view, the invention resides in the combination of parts and in the details of construction hereinafter set forth in the following specification and appended claims, certain embodiments thereof being illustrated in the accompanying drawings, in which:

Figure 1:
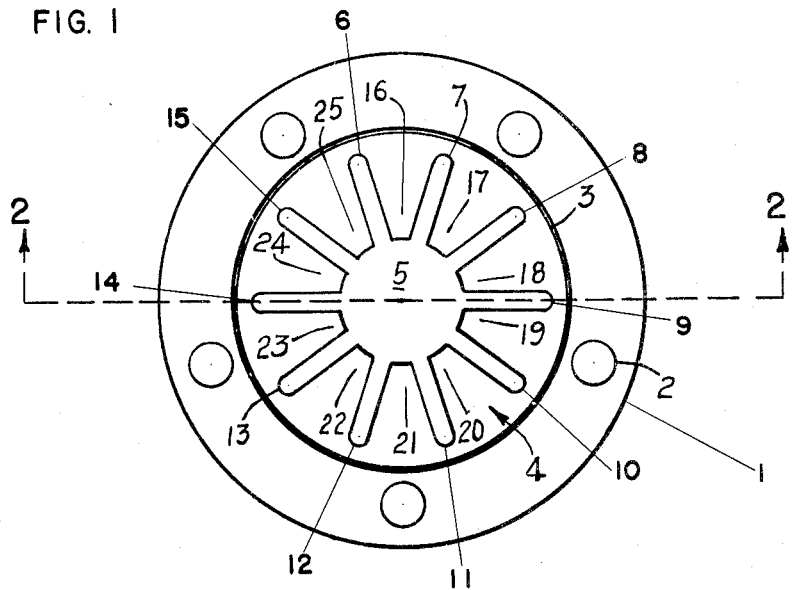
Figure 1 is a view in elevation of one form that my improved electric regulator spring may take.
Figure 2:
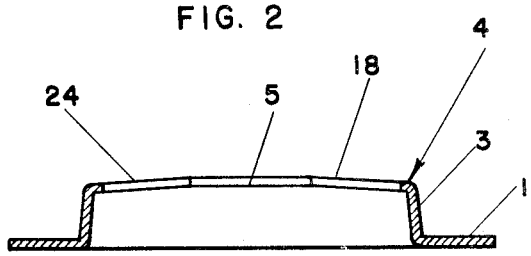
Figure 2 is a view in section taken along line 2—2 of Figure 1.

Referring more particularly to the drawings, I have shown in Figures 1 and 2 one form which my improved finger type electric regulator spring may take. As shown, it comprises a rim 1 with suitable attachment holes 2 and an angular radially inwardly inclined raised portion 3. The top wall, generally indicated at 4, completes the outer contour of the spring unit to be of inverted cup-shaped formation, generally speaking.

However, in completing the design of my spring, I cut out of the top wall 4 a central aperture 5, in which I cut ten radially outwardly extending slots 6 to 15, inclusive, to provide therebetween ten inwardly extending fingers 16 to 25, inclusive. Each of these fingers is tapered to decreasing width radially inwardly. Also, each finger, such as fingers 18 and 24, is also bowed, curved or inclined upwardly from the place of rim 1 toward the center opening and the separated tips of the fingers, as viewed in Figure 2.

Figure 3:
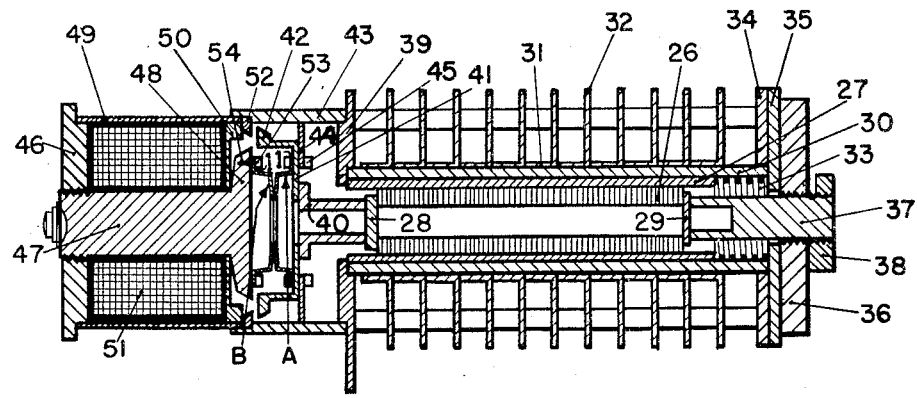
Figure 3 is a view in longitudinal section taken through a carbon pile regulator, showing a carbon pile stack, an electromagnet and a pair of opposed regulator springs designed in accordance with my invention.
Figure 4:
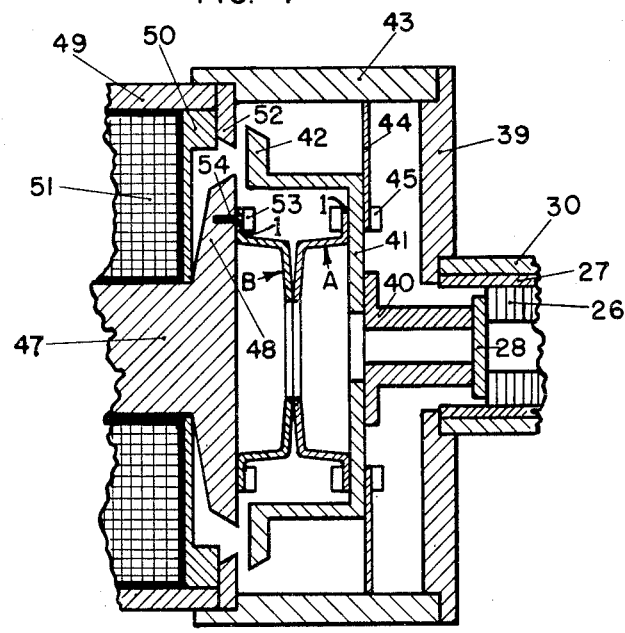
Figure 4 is an enlarged fragmentary view in longitudinal section, showing the two opposed springs in greater detail.

In Figure 3, I have shown, as an environment for my improved electric regulator spring design, a carbon pile regulator, in which is arranged a stack of centrally apertured round carbon discs 26, housed within a Pyrex tube 27 and longitudinally disposed between end buttons 28 and 29. Surrounding the tube 27 is a fin assembly tube 30 to receive the horizontal flanges 31 of a series of cooling fins 32 that extend radially upwardly. Surrounding the right end of tube 27 is a plate 34 that is rigid with a parallel plate 35 whose center portion bears against the outer end of tube 30, and rigid with plate 35 is another plate 36 having internal screw threads to receive a screw bolt 37 provided with a hand knob 38, the purpose of which latter is to adjust the compression of the stack of carbon pile discs 26 between the end buttons 28 and 29. Interposed between plate 35 and the right end of tube 27 is a compression coil spring 33 to resiliently maintain tube 27 in place and in abutment with a forward adapter plate 39.

The mount 40 for the end button 28 is rigid with legs 41 of the armature 42. Extending radially inwardly from case section 43 is a centrally apertured circular centering spring 44. By means of a retaining ring 45, I secure to the centering ring 44 the leg 41 of the armature 42 and the rim portion 1 of a spring, such as illustrated in Figures 1 and 2, and generally indicated at A. At 46 I have shown a back plate to screw-threadedly receive the left end of a core 47 having an enlarged head 48 at its forward end. Within the magnet case 49, and surrounding core 47 and disposed longitudinally between the back plate and a spacer 50, is a coil 51. Forwardly of spacer 50 is arranged a face plate 52. To the front end of the enlarged head 48 of the core 47, I secure another spring, generally indicated at B by means of the retaining ring 53 and a screw 54 passing through rim 1 of spring B and into the core head 48.

It will also be seen that the central apertures 5 of springs A and B are in alignment and that their bowed portions and the fingers are opposed and that the tips of the fingers are in light abutment with each other in their initial flexing and tangential engagement.

By reference to the drawings, it will be seen that my function spring differs from the conventional finger type spring, not only in that the finger tips are inside, but also in that the width of the spring increases as a function of the distance from the tip. It can be shown that the deflective characteristic for a uniform cross section cantilever spring is a linear function of the applied force. In this case, the non-linear function enters when the leaf tips become tangent and further increase in force decreases the effective length of the leaf.

In applying the function spring it is desirable to operate around the region where the leaves become tangent since the desired square function can be easily obtained to match the magnet force curve. When the magnet force stroke curve has been calculated, the desired leaf contour can be arrived at by designing equivalent slope constant cross-section beams corresponding to various operating points in force and deflection. It follows that a spring of this type may also be made to match other than square functions.

I claim:

1. In an electric regulator, an electromagnet having two relatively movable parts displaceable by electromagnet action, a pair of mechanical spring members positioned in opposed relationship, each of said spring members comprising a rim, a middle bowed portion and a plurality of radially extending slots from said centrally apertured portion to provide a plurality of radially inwardly extending fingers that are tapered to decreasing width at their inner extremities, each of said fingers being of greater width than each of said radial slots, said spring members being arranged in opposed relationship to bring the inner tapered ends of said fingers into engagement with each other, so as to be operative to urge said relatively movable parts against the action of said electromagnet.

2. An electric regulator, an electromagnet having two relatively movable parts displaceable by electromagnet action, a pair of mechanical spring members positioned in opposed relationship, each of said spring members comprising a rim, a middle bowed portion and a centrally apertured portion, with a plurality of radially extending slots from said centrally apertured portion to divide said bowed portion into a plurality of radially inwardly extending fingers that are tapered to decreasing width at their inner extremities, each of said fingers being of greater width than each of said radial slots, said spring members being arranged in opposed relationship to bring the inner tapered ends of said fingers into engagement with each other, so as to be operative to urge said relatively movable parts against the action of said electromagnet.

3. An electric regulator comprising a carbon pile, an electromagnet having two relatively movable parts displaceable by electromagnet action, a pair of mechanical spring members positioned in opposed relationship, each of said spring members comprising a rim, a middle bowed portion and a centrally apertured portion, with a plurality of radially extending slots from said centrally apertured portion to divide said bowed portion into a plurality of radially inwardly extending fingers that are tapered to decreasing width at their inner extremities, each of said fingers being of greater width than each of said radial slots, said spring members being arranged in opposed relationship to bring the inner tapered ends of said fingers into engagement with each other, so as to be operative to urge said relatively movable parts against the action of said electromagnet.

4. An electric regulator, an electromagnet having two relatively movable parts displaceable by electromagnet action, a pair of mechanical spring members positioned in opposed relationship, each of said spring members comprising a rim, a middle bowed portion and a centrally apertured portion, with a plurality of radially extending slots from said centrally apertured portion to divide said bowed portion into a plurality of radially inwardly extending fingers that are tapered to decreasing width at their inner extremities, each of said fingers being of greater width than each of said radial slots, said spring members being arranged in opposed convex relationship to bring the inner tapered ends of said fingers into engagement with each other, so as to be operative to urge said relatively movable parts against the action of said electromagnet, and so that the movement of one part of said electromagnet toward the other wraps the fingers of one spring member upon those of the other and said carbon pile is subjected to the difference between the magnet pull and the spring pressure.

5. An electric regulator comprising a carbon pile, an electromagnet having two relatively movable parts displaceable by electromagnet action, a pair of mechanical spring members positioned in opposed relationship, each of said spring members comprising a rim, a convex bowed portion and a centrally apertured portion, with a plurality of radially extending slots from said centrally apertured portion to divide said bowed portion into a plurality of radially inwardly extending fingers that are tapered to decreasing width at their inner extremities, each of said fingers being of greater width than each of said radial slots, said spring members being arranged in opposed convex relationship to bring the inner tapered ends of said fingers into engagement with each other, so as to be operative to urge said relatively movable parts against the action of said electromagnet, and so that the movement of one part of said electromagnet toward the other wraps the fingers of one spring member upon those of the other and said carbon pile is subjected to the difference between the magnet pull and the spring pressure.

References Cited in the file of this patent

UNITED STATES PATENTS

| Number | Name | Date |
|---|---|---|
| 15,698 | Johnson | Sept. 9, 1856 |
| 2,325,193 | Nutt et al. | July 27, 1943 |
| 2,396,596 | Moore | Mar. 12, 1946 |
| 2,565,108 | Zahodiakin | Aug. 21, 1951 |
| 2,590,223 | Walley et al. | Mar. 25, 1952 |
| 2,634,123 | Ralston | Apr. 7, 1953 |